United States Patent
Burba et al.

(10) Patent No.: US 10,778,781 B2
(45) Date of Patent: Sep. 15, 2020

(54) CONTENTION MANAGEMENT IN COMMUNICATION NETWORKS

(71) Applicant: Microsoft Technology Licensing, LLC, Redmond, WA (US)

(72) Inventors: Alexander Burba, Seattle, WA (US); Brandon T. Hunt, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 209 days.

(21) Appl. No.: 15/592,098

(22) Filed: May 10, 2017

(65) Prior Publication Data

US 2018/0332121 A1    Nov. 15, 2018

(51) Int. Cl.
*H04L 29/08* (2006.01)
*H04L 12/819* (2013.01)

(52) U.S. Cl.
CPC ........ *H04L 67/148* (2013.01); *H04L 67/1055* (2013.01); *H04L 67/1065* (2013.01);
(Continued)

(58) Field of Classification Search
CPC . H04L 47/21; H04L 67/1055; H04L 67/1065; H04L 67/1076; H04L 67/14;
(Continued)

(56) References Cited

U.S. PATENT DOCUMENTS

| 2005/0086288 | A1* | 4/2005 | Datta | H04L 45/02 709/201 |
| 2008/0002647 | A1* | 1/2008 | Laroia | H04L 5/0035 370/338 |

(Continued)

FOREIGN PATENT DOCUMENTS

| CN | 102904933 A | 1/2013 |
| EP | 1408653 A1 | 4/2004 |
| EP | 2200248 A1 | 6/2010 |

OTHER PUBLICATIONS

Jia, et al., "A Cluster-based Peer-to-Peer File Sharing Protocol for Mobile Ad Hoc Networks", in Proceedings of International Symposium on Computer Network and Multimedia Technology, Jan. 18, 2009, 4 pages.

(Continued)

*Primary Examiner* — Joe Chacko

(57) ABSTRACT

In some embodiments, a peer matching service classifies client devices into a bucket where similar network identification information is received from the client devices and is associated with an access point to which the client devices are connected to transfer content via a peer to peer transfer. The service determines whether to transition the bucket from a first operating mode into a contention management mode based on a status of client devices in the bucket. The status is based on a connection type for the client devices. When the bucket is transitioned into the contention management mode, the service applies instructions associated with the contention management mode to characteristics associated with the client devices to determine a restriction for peer to peer transfer of the content and communicates with the client devices to apply the restriction to the peer to peer transfer of the content through the access point.

20 Claims, 11 Drawing Sheets

(52) U.S. Cl.
CPC .......... *H04L 67/1076* (2013.01); *H04L 67/14* (2013.01); *H04L 67/322* (2013.01); *H04L 47/21* (2013.01); *H04L 67/141* (2013.01); *H04L 67/143* (2013.01)

(58) Field of Classification Search
CPC ... H04L 67/141; H04L 67/143; H04L 67/148; H04L 67/322
See application file for complete search history.

(56) References Cited

U.S. PATENT DOCUMENTS

| | | | | |
|---|---|---|---|---|
| 2008/0049687 | A1* | 2/2008 | Shankar | H04W 28/08 370/338 |
| 2008/0140780 | A1* | 6/2008 | Hopkins | H04L 67/104 709/205 |
| 2011/0087731 | A1* | 4/2011 | Wong | G06F 9/505 709/204 |
| 2011/0170468 | A1* | 7/2011 | Jain | H04W 48/12 370/312 |
| 2011/0173305 | A1* | 7/2011 | Matuszewski | H04L 45/02 709/221 |
| 2013/0142038 | A1* | 6/2013 | Pan | H04L 47/25 370/230 |
| 2013/0238919 | A1* | 9/2013 | Ponmudi | H04W 52/0216 713/323 |
| 2014/0086180 | A1 | 3/2014 | Lee et al. | |
| 2014/0241257 | A1* | 8/2014 | Ding | H04W 48/08 370/329 |
| 2015/0156797 | A1* | 6/2015 | Park | H04W 74/0808 370/329 |
| 2016/0073288 | A1* | 3/2016 | Patil | H04W 74/08 370/230 |
| 2016/0286469 | A1 | 9/2016 | Wang et al. | |
| 2017/0359412 | A1* | 12/2017 | Haebler | H04L 67/06 |

OTHER PUBLICATIONS

Milojicic, et al., "Peer-to-Peer Computing", https://www.cs.kau.se/cs/education/courses/dvad02/p2/seminar4/Papers/HPL-2002-57R1.pdf, Published on: Jul. 10, 2002, 52 pages.

Motta, et al., "Wireless P2P: Problem or Opportunity?", in Proceedings of the Second International Conference on Advances in P2P Systems, Oct. 2010, pp. 32-37.

"International Search Report and Written Opinion Issued in PCT Application No. PCT/US2018/028765", dated Jul. 19, 2018, 12 Pages.

* cited by examiner

CONTENTION MANAGEMENT IN COMMUNICATION NETWORKS

BACKGROUND

In a peer-to-peer network, a client device connects with peer client devices to download content. To find other peer client devices, the client device communicates with a peer matching service that generates a list of peer client devices. The peer matching service may use algorithms to select peer client devices that are close to the client device. For example, peer client devices that are on the same local area network (LAN) may be the best peers that a client device can connect to for content download. The peer matching service may prioritize the LAN peer client devices over other peer client devices that are not connected to the same LAN as the client device.

Even if on the same LAN, it is possible that the client device and the peer client devices may connect through a connection type that may suffer from constrained resources to transfer content. For example, if there is a large congregation of client devices connecting to a single access point, and each of the client devices receives a list of peer client devices connected to that access point, the resources available for connecting each of the client devices may be constrained. When each client device connected to the access point is provided with a majority of the same peer client devices, the number of connections actively transferring content through the access point exponentially increases. For example, if there are 500 client devices connected to an access point that are downloading the same content using peer-to-peer, and each client device receives 50 peer client devices connected to the same access point, this may result in 25,000 connections actively transferring data through the access point. Given the resulting network congestion at the access point, this may result in degraded performance when downloading the content via peer-to-peer.

DETAILED DESCRIPTION

Figure 1:
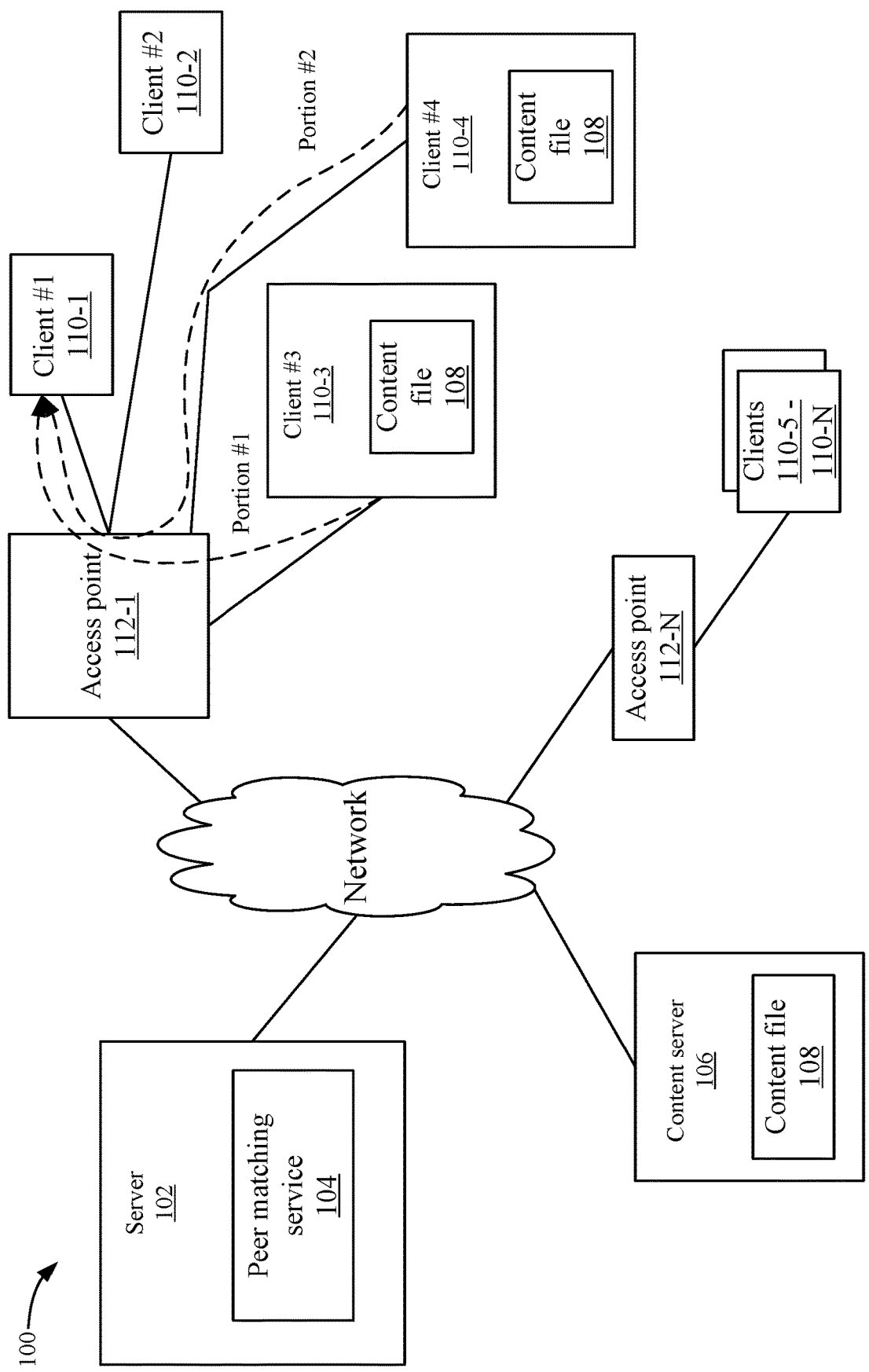
FIG. 1 depicts a simplified system of a method for performing contention management in a communication network according to some embodiments.

In the following description, for purposes of explanation, numerous examples and details are set forth in order to provide an understanding of certain embodiments. It will be evident, however, to one skilled in the art that some embodiments can be practiced without some of these details, or can be practiced with modifications or equivalents thereof.

Some embodiments provide a peer matching service that performs contention management for a network, such as a peer-to-peer network. A peer-to-peer network is a network in which a client device downloads a content file from one or more peer client devices rather than from only a server in a client-server relationship. The peer matching service may select a list of peer client devices that a client device can use to download or provide a content file. The client device may attempt to connect to any of the peer client devices in the list to either download at least a portion of the content file from those peers or provide at least a portion of the content file to those peers.

The peer matching service receives network identification information from multiple clients that want to transfer the content file. These client devices may be receivers of the content file (e.g., want to download from another client device), providers of the content file (e.g., want to provide the content file to another client device), or a combination of both a receiver and a provider. Although "downloading" of the content file is described in some examples, it will be recognized that a client device may also be performing similar functions to provide the content file to a peer client device. In general, the transfer of the content file may be receiving the content file or providing the content file.

The multiple clients may be connected via different access points, where the access points may connect to client devices via different connection types. For example, an access point may be a wireless access point that is providing a wireless connection for the content transfer. Other connection types may be a wired connection, such as an Ethernet connection, that will be used to transfer the content file. The peer matching service then classifies clients that have similar network identification information into a bucket. A bucket may be a storage area that lists client identifiers that are associated with the bucket. Similar network identification information may be the same network identifier, such as an Internet protocol (IP) address or service set identifier (SSID). In some examples, this classifies clients connecting via the same access point into the same bucket. The peer matching service may have many buckets that each has a number of clients within the bucket.

The peer matching service also receives an indication from the clients as to which connection type the clients will use to transfer the content file. For example, some clients may indicate they will use a wireless connection type to transfer the content file whereas some clients may be using a wired connection type to transfer the content file. The peer matching service can then determine whether or not to transition a bucket from a normal mode that has no restrictions into a contention management mode that may restrict the peer-to-peer transfer of content for clients in a bucket. For example, if a large number of client devices in a bucket are using a connection type that has constrained resources, such as a wireless access point may have a limited number of resources that can be used to transfer a content file via a wireless connection type, the peer matching service may determine that the client devices in the bucket should be entered into a contention management mode.

Once the contention management mode is enabled, the peer matching service may apply instructions associated with the contention management mode to the clients in the bucket to control the peer-to-peer transfer of the content file by the clients. The instructions may list conditions that need to be fulfilled for the instruction to apply. When different instructions apply, the peer matching service may apply different restrictions that are associated with respective instructions. For example, the restrictions may include limiting the number of connections or the bandwidth used by clients to transfer the content file from peer client devices. Additionally, the peer matching service may drop some existing connections between peer client devices. Finally, the peer matching service may cause some client devices to wait to transfer the content file or pause an existing transfer of the content file.

In some examples, there may be a large congregation of users in a same location, such as 500 users attending the same conference that are all connected to a wireless access point. If an update happened to be published, all 500 of the users' client devices, such as laptops or mobile devices, might attempt to download the update using peer-to-peer networking. In this case, it is possible that the wireless access point will become overloaded with connections to download the update. For example, if each user received 50 peer client devices on the same wireless access point, this would results in about 25,000 connections actively transferring data through the single wireless access point. Some embodiments may identify this sort of situation and apply limits to restrict the peer-to-peer networking. For example, the limits may include reducing the number of peer client devices in a list of peer client devices, instructing client devices to limit connections, drop connections, limit bandwidth, wait to start a transfer, or pause a transfer.

Some embodiments may improve the performance of content transfer via peer-to-peer networking. For example, if it is detected that a condition is being experienced that would degrade performance at an access point, some embodiments may put restrictions on the peer-to-peer transfer at client devices. Although restrictions on the peer-to-peer transfer may be applied, the restrictions may not cause dropped connections, degraded data transfer, or increased data acquisition time. For example, by limiting the number of connections, the available bandwidth for the active connections at the wireless access point may not experience degraded performance.

Overview

FIG. 1 depicts a simplified system 100 of a method for performing contention management in a communication network according to some embodiments. System 100 includes a server 102 that includes a peer matching service 104. Also, a content server 106 may store a content file 108 that needs to be downloaded by client devices 110-1 through 110-N. Groups of client devices 110 may be coupled to different access points 112-1 through 112-N. For discussion purposes, client devices 110 connected to a single access point 112 will be discussed, but it will be understood that the process described may be performed for multiple groups of client devices 110 connected to respective access points 112.

Content server 106 may store a content file 108 that client devices 110 want to download. For example, content file 108 may be an update to an application being run on client devices 110. Each instance of the application running on client devices 110 may be required to download content file 108. In another example, an update to a game may be released and game consoles may attempt to download the update. In other embodiments, content file 108 may be any type of content that a group of client devices 110 need to download. In some examples, client devices 110 may be notified that client devices 110 should start downloading content file 108 at a certain time, such as an update to an operating system may be released at a certain time and client devices 110 may attempt to start downloading the update when the update is released.

In some embodiments, a peer-to-peer (P2P) network is used to distribute content file 108. Peer-to-peer networking is where the downloading of content file 108 may be distributed through multiple peer client devices 110. For example, a client device 110-1 may download a portion of content file 108 from client device 110-3 and a second portion of content file 108 from client device 110-4. The downloading of the portions of content file 108 may go through access point 112-1. For discussion purposes, when the download of content file 108 is described, it will be recognized that this may mean a portion of content file 108. For example, client devices 110 may download different portions of content file 108 from different client devices 110, and not the entire content file 108 from the same client device 110.

Peer-to-peer networking is different from a client-server model in that the peer client devices connect to each other to download content file 108. In a client-server model, all client devices 110 would contact content server 106 individually to download content file 108. In a peer-to-peer networking model, it will be recognized that at least one client device 110 would need to download content file 108 from content server 106. However, once client devices 110 download portions of content file 108, those portions can be distributed to other client devices 110 via peer to peer networking.

Access point 112 may provide different connection types to client devices 110. In some examples, access point 112 may be a wireless access point that is providing wireless connectivity through different wireless technologies or protocols, such as WiFi, Bluetooth, Worldwide Interoperability for Microwave Access (WiMAX), cellular, or other wireless connection types. Additionally, access point 112 may also include a wired connection, such as Ethernet. System 100 may include access points 112 that include only wireless connection types, only wired connection types, or a combination of both wireless and wired connection types.

In some embodiments, some connection types may have constrained resources to communicate the content download. For example, a wireless technology being used by access point 112 may not have the available bandwidth to allow over a certain amount of client devices 110 to transfer content file 108 via peer-to-peer without performance degradation occurring. This may be because a single wireless access point 112 may experience degraded data transfer bandwidth, dropped connections, or increased content download time when a certain number of client devices 110 attempt to download content file 108 via peer-to-peer simultaneously. However, it is possible that a wired network may have enough bandwidth to accommodate all clients 110 connected to the wired connection to download content file 108 via peer-to-peer. Although a wireless access point will be described with a wireless connection type having constrained resources, it will be understood that the contention management process described may be used for different connection types and even a wired connection if any of the connection types experience constrained resources. Peer matching service 104 may determine that a connection type has constrained resources based on a definition of which connection types may be constrained. For example, peer matching service 104 may be configured such that wireless connection types may be considered as having constrained resources while wired connection types do not have constrained resources.

Initiation of Content Transfer at the Client Side

Figure 2:
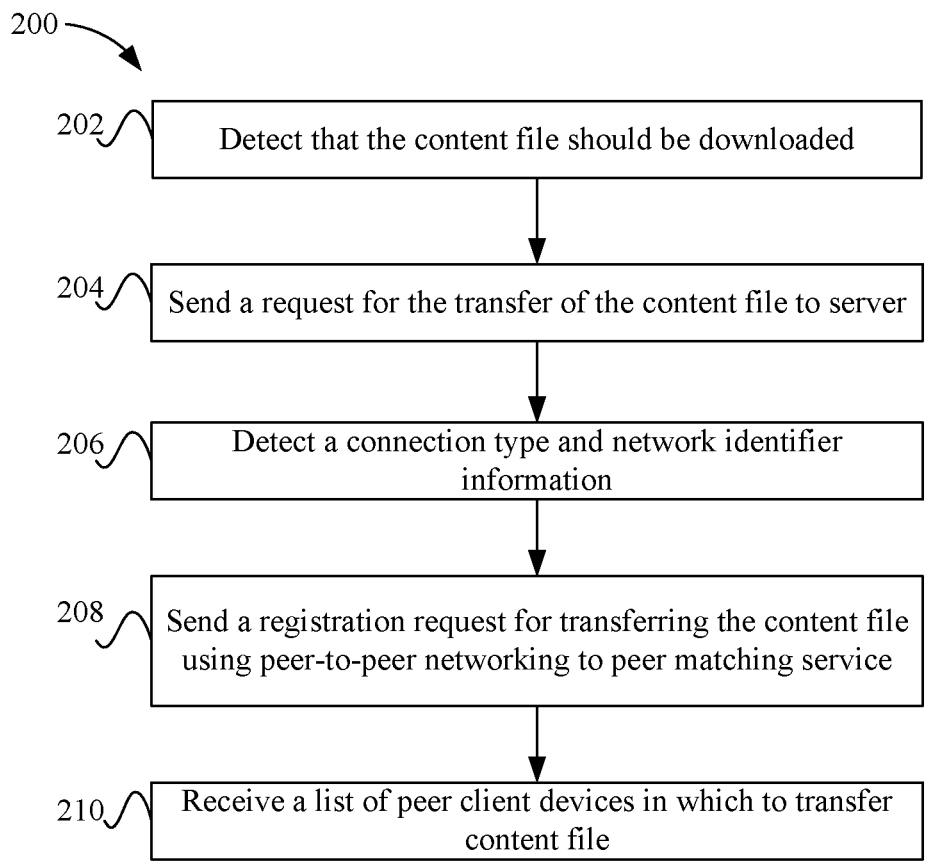
FIG. 2 depicts a simplified flowchart of a method for initiating the peer-to-peer content download at a client device according to some embodiments.

To set up the peer-to-peer content download of content file 108, client device 110 may initiate the process. FIG. 2 depicts a simplified flowchart 200 of a method for initiating the peer-to-peer content transfer at client device 110 according to some embodiments. At 202, client device 110 detects that content file 108 should be downloaded. For example, client device 110 may be notified of the download or be checking continuously for updates to an application. For example, the operating system or any other application running on client device 110 may receive notification an update is available.

At 204, client device 110 may send a request for the transfer of content file 108. The request may specify that peer-to-peer networking is desired for the transfer. In another embodiment, client device 110 may send a request for the transfer and then server 102 or another service may determine that peer-to-peer networking should be used for the transfer. In some cases, it may be determined that peer-to-peer networking should not be used and a client-server relationship with content server 106 should be used to transfer content file 108.

At 206, assuming that peer-to-peer networking is selected, client device 110 detects a connection type and network identifier information. The connection type may be the type of connection that would be used by client 110 to transfer content file 108 from/to other peer client devices 110. For example, client device 110 may be using a wireless card to connect to wireless access point 112-1. Client device 110 detects this connection via the wireless card and can determine that the connection type is wireless. Also, client device 110 can detect the network identifier that is associated with client device 110, such as the IP address or SSID of client device 110. The IP address or SSID may be associated with the access point to which client device 110 is connected. In some embodiments, each client device 110 connected to access point 112 has the same network identifier information.

At 208, client device 110 then sends a registration request for transferring content file 108 using peer-to-peer networking to peer matching service 104. The registration request may also include the connection type and the network ID associated with client device 110. In some embodiments, the connection type may be provided via a bit that may be set as a flag. For example, a bit in the request may be set as "1" when the connection type is wireless and either not set or set as "0" when the connection type is something other than wireless, such as a wired connection type.

At 210, client device 110 receives a list of peer client devices 110 from which to transfer content file 108. In some embodiments, client device 110 is the receiver of content file 108 and this list includes peer client devices 110 that are storing a portion of content file 108. When client device 110 is a provider of content file 108, the list includes possible peer client devices 110 to which this client device could send content file 108. Also, it is possible that the list may include providers, receivers, or a combination of both.

During a normal operation mode, peer matching service 104 allows client devices 110 to connect to any of the list of peer client devices to transfer content file 108. Client devices 110 may reach out to any number of peer client devices on the list, such as all of them, to request the transfer of content file 108. The number of connections may be referred to as crosstalk and when there are a high number of client devices 110 connected to the same access point 112, a high number of messages may be exchanged via access point 112 and also a high number of connections may be established to transfer portions of content file 108 via access point 112. This may degrade performance when access point 112 can only accommodate a certain amount of connections or data bandwidth. Accordingly, peer matching service 104 provides a contention management mode that can be triggered to restrict or limit the peer-to-peer communication.

Contention Management

In some embodiments, system 100 may operate in a normal operating mode and a contention management mode. A normal operating mode does not have restrictions on client devices 110 in contacting peer client devices on the list to perform the content transfer of content file 108 via peer-to-peer networking. Contention management mode may apply instructions that may select certain restrictions that may orchestrate the behavior of clients 110 in performing the peer-to-peer transfer of content file 108. Although two modes are discussed, it will be recognized that the contention management mode may be automatically entered into, such as via a trigger from client devices 110 or access points 112 or be automatically used from the beginning for a certain transfer of content.

Figure 3:
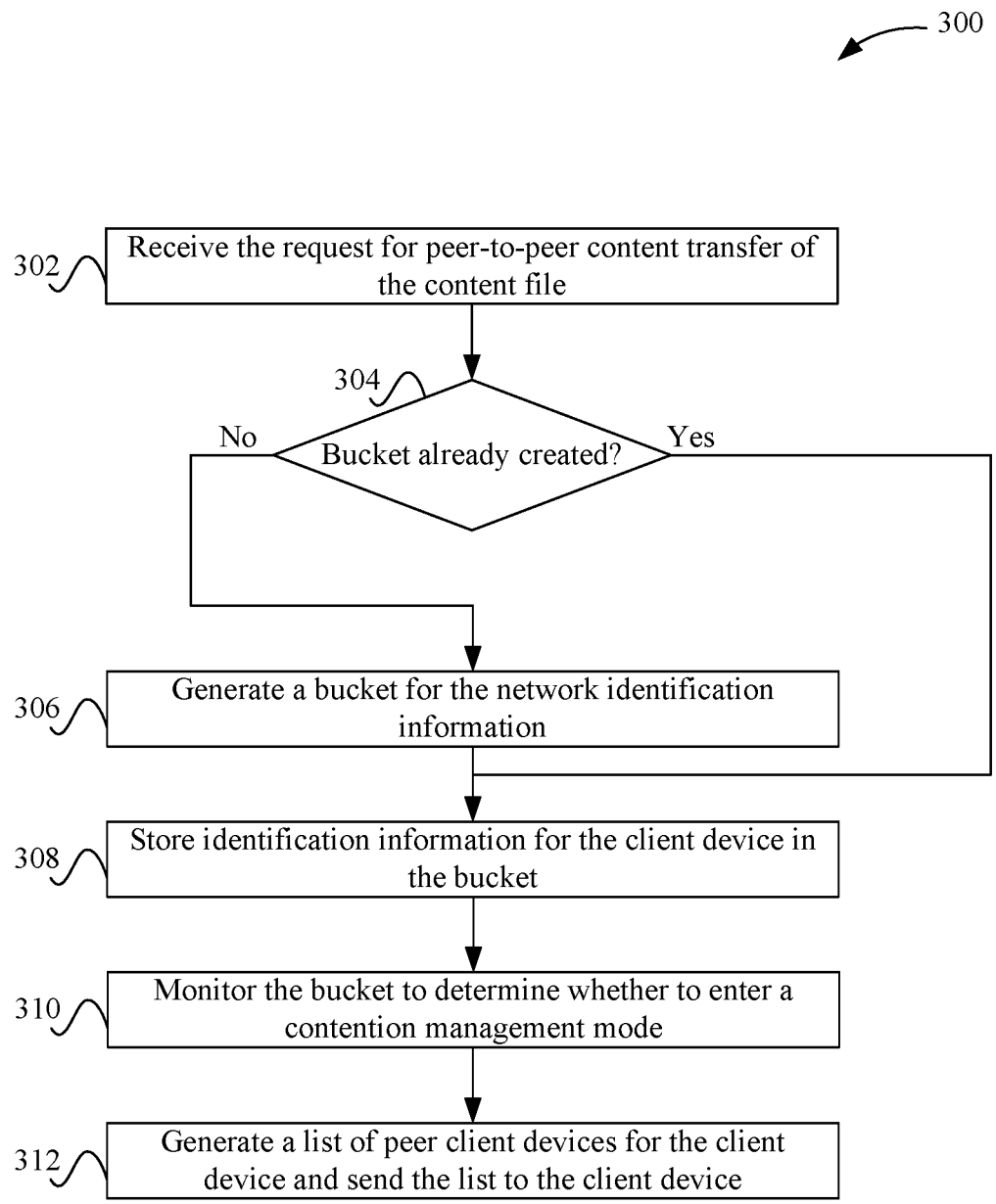
FIG. 3 depicts a simplified flowchart of a method for analyzing whether to enter into contention management mode at a peer matching service according to some embodiments.

FIG. 3 depicts a simplified flowchart 300 of a method for analyzing whether to enter into contention management mode at peer matching service 104 according to some embodiments. At 302, peer matching service 104 receives the request for peer-to-peer content transfer of content file 108. The request includes the network identification information and also the connection type. In some embodiments, peer matching service 104 may receive multiple requests from multiple client devices 110 connected to different access points 112.

At 304, peer matching service 104 determines if a bucket has already been created for the network identification information. For example, peer matching service 104 may create buckets, which are groupings of client devices 110 that have similar network identification information. The buckets may be stored in storage and identified by bucket identifiers. In some embodiments, a bucket may be storage that stores client identifiers for client devices 110 that have the exact same network identification information, such as the same IP address or SSID. Also, it is possible that the network identification information may not be exact, but some information is similar in order to indicate that client devices 110 are connected to the same access point 112. However, at least a portion of the network identification information may be similar, such as a prefix or another portion of the network identification information may be the same.

If a bucket does not already exist, peer matching service 104, at 306, generates a bucket for the network identification information. Then, at 308, peer matching service 104 stores identification information for client device 110 in the bucket. The client identification information may include characteristics of client device 110, such as a client unique identifier, and also the connection type for that client device 110. Also, if a bucket already existed, then peer matching service 104 would store identification information for client device 110 in the already existing bucket.

At 310, peer matching service 104 may monitor the bucket to determine whether to enter a contention management mode. The monitoring will be described in more detail in FIG. 4. For this example, it is assumed contention management mode should not be enabled at this time, and at 312, peer matching service 104 generates a list of peer client devices 110 for client device 110 and sends the list to client device 110. Peer client devices 110 may be peer client devices in the same bucket as client device 110. These peer client devices 110 may be connected to the same access point 112. However, it is possible that peer client devices 110 that do not have the same network identification information may also be identified and included in the list of peer client devices.

Figure 4:
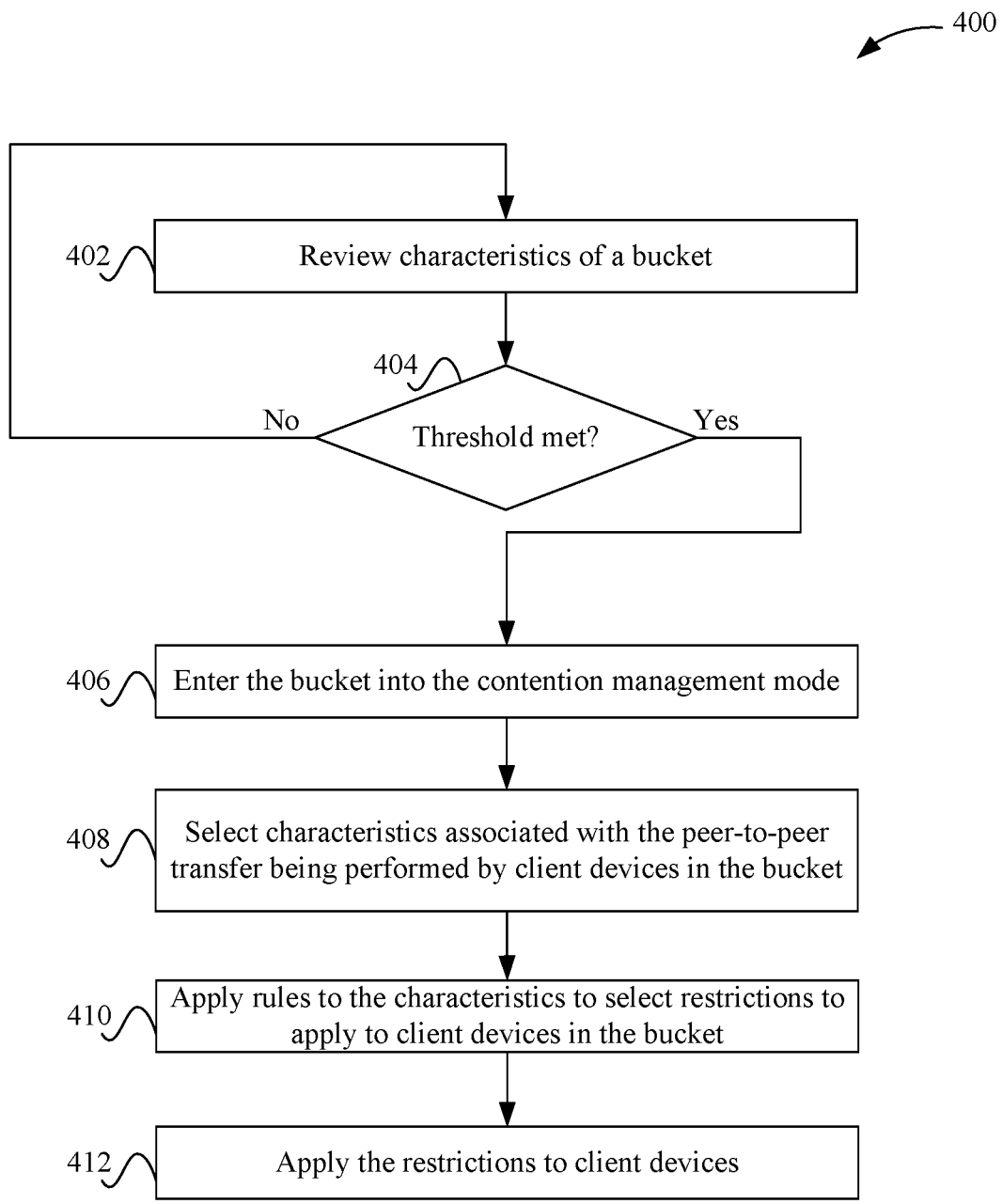
FIG. 4 depicts a simplified flowchart of a method for determining whether to enter into the contention management mode according to some embodiments.

Peer matching service 104 may continually monitor buckets to determine whether to transition from a normal operating mode to a contention management mode. FIG. 4 depicts a simplified flowchart 400 of a method for determining whether to enter into the contention management mode according to some embodiments. Although this process is described for a single bucket, peer matching service 104 may perform the process for each bucket. At 402, peer matching service 104 reviews characteristics of a bucket. For example, the characteristics may be the connection type associated with client devices 110 in the bucket. Other characteristics may also be analyzed, such as the number of connections through an access point 112.

At 404, peer matching service 104 compares the characteristics of the bucket to a threshold to determine if the threshold is met. For example, peer matching service 104 compares a number of client devices 110 that have a connection type to a threshold or compares a ratio of the number of clients that have the connection type to the total number of client devices 110 in the bucket to a threshold. In some examples, if a certain number of client devices are connected via a wireless connection type or a ratio of, for example, 50%, of client devices 110 in the bucket are connected via a wireless connection type, then peer matching service 104 determines that the threshold is met. The process reiterates to keep monitoring characteristics of the bucket at 402 if the threshold is not met. For example, the bucket may be monitored continuously as different client devices 110 connect to peer matching service 104 to download a content file 108.

If the threshold is met, then at 406, peer matching service 104 enters the bucket into the contention management mode. This transitions the bucket from the normal operating mode to the contention management mode. In the contention management mode, certain restrictions may be applied to the peer-to-peer networking of the client devices 110 in the bucket. For example, at 408, peer matching service 104 selects characteristics associated with the peer-to-peer transfer being performed by client devices 110 in the bucket. For example, the characteristics may include the number of wireless connection types in the bucket, the number of connections, and the speed of data transfer being experienced by the connections. The number of the connections may be how many connections have been requested or opened by client devices 110 in the bucket. For example, some client devices 110 that may have opened up connections to provide content file 108 with other peer client devices and some client devices 110 may have opened up connections with other peer client devices to receive portions of content file 108. The speed may be the speed in which the portions of content file 108 are being transferred over access point 112. In some examples, it may be desirable to have fewer numbers of wireless connection types, fewer numbers of connections, and a higher speed.

At 410, peer matching service 104 applies instructions to the characteristics to select restrictions to apply to client devices 110 in the bucket. In some embodiments, different instructions may be applied to determine different restrictions to apply. For example, a combination of the number of wireless connections, the number of connections in total (e.g., wireless and wired), and the speed may be used to determine different restrictions. The restrictions will be described in more detail below, but may include restrictions that restrict the operation of the peer-to-peer downloading of content for client devices 110 in the bucket.

At 412, once the restrictions are determined, peer matching service 104 applies the restrictions to client devices 110. In this case, peer matching service 104 may control or orchestrate the operation of client devices 110 in the peer-to-peer networking download of content file 108. For example, peer matching service 104 communicates with client devices 110 to restrict some operations of client devices 110.

Restrictions

Peer matching service 104 may apply different restrictions based on instructions that apply to the characteristics of the bucket. In some embodiments, a list of peer client devices 110 may be provided to client devices 110 or may have already been provided to client devices 110. Peer matching service 104 may limit the number of peers provided to client devices 110 in the future while in contention management mode. Also, peer matching service 104 may take a tiered approach to applying the restrictions to client devices 110 actively trying to download content file 108.

Figure 5:
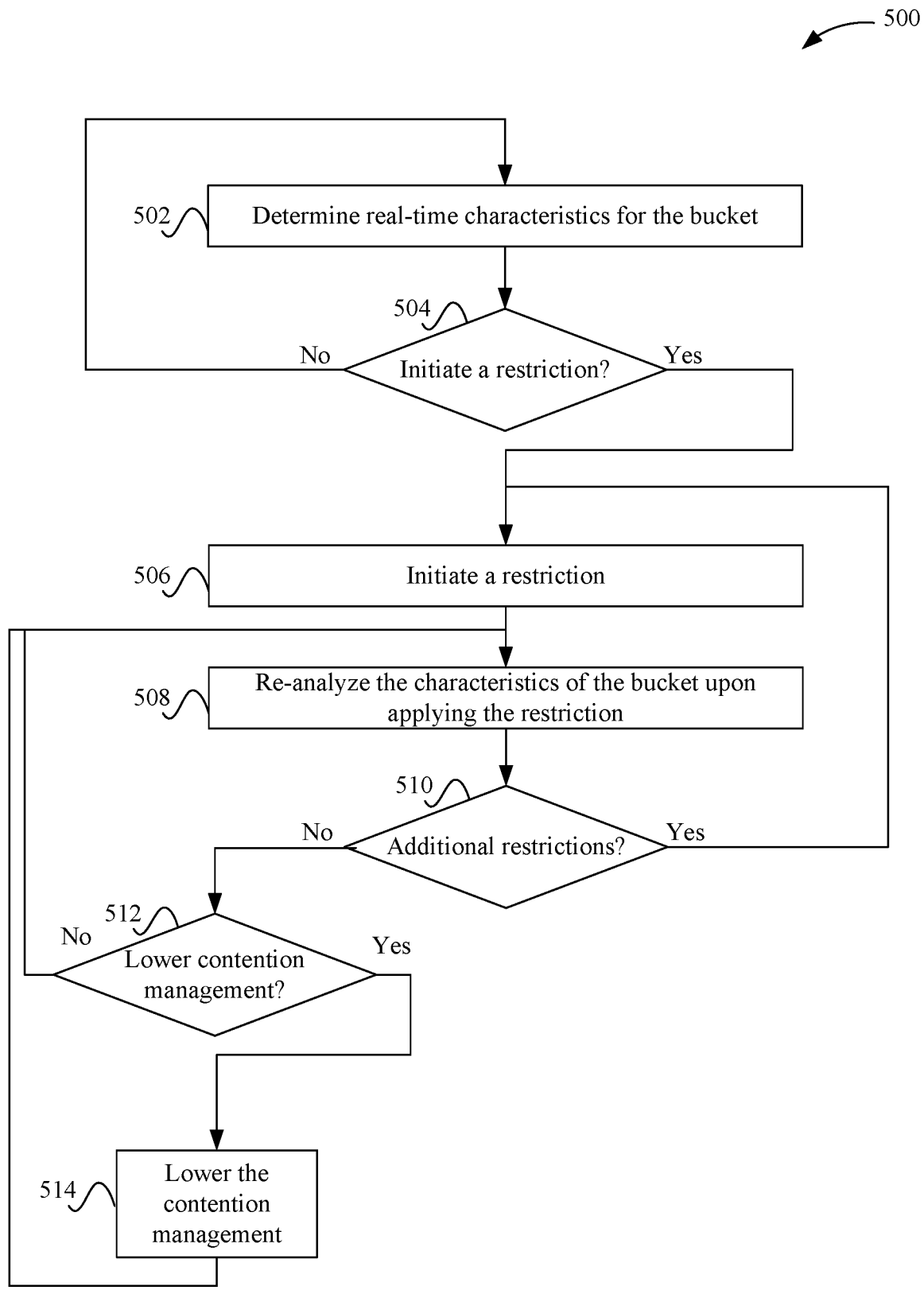
FIG. 5 depicts a simplified flowchart of a method for applying the restrictions according to some embodiments.

FIG. 5 depicts a simplified flowchart 500 of a method for applying the restrictions according to some embodiments. At 502, peer matching service 104 determines real-time characteristics for the bucket. The characteristics may include information received from client devices 110 that are currently downloading content file 108 at access point 112. Some examples of characteristics may be a combination of the number of wireless connections, the number of connections in total at access point 112, and the speed of data transfer for the connections. In some examples, the characteristics may be real-time statistics describing the current conditions being experienced at access point 112 to perform the peer to peer transfer. The characteristics may be different from the characteristics used to enter the bucket into the contention management mode or may be the same.

At 504, peer matching service 104 determines whether to initiate a restriction on the peer to peer networking. If not, the process reiterates to monitor the bucket at 502. If a restriction is required, then at 506, peer matching service 104 initiates a restriction. In some examples, peer matching service 104 may initiate different levels of restrictions depending on the conditions being experienced at access point 112. For example, peer matching service 104 may implement a first level of restrictions, and if conditions do not improve, initiate a second level of restrictions, and so on. Examples of the levels of restrictions will be described below.

At 508, peer matching service 104 re-analyzes the characteristics of the bucket upon applying the restriction. For example, as the restrictions are applied, the characteristics of the bucket may change, such as certain client devices 110 may finish the content download of content file 108, bandwidth may improve, and/or the number of active connections may drop. This may improve the conditions for the peer-to-peer networking. However, the conditions may not improve even though the restrictions were applied at 506. Accordingly, peer matching service 104 may apply additional restrictions. At 510, peer matching service 104 may determine whether or not to perform additional restrictions. For example, additional restrictions may not be needed if the number of connections is stable or decreases, or the available bandwidth is stable or increases. If additional restrictions are not needed, at 512, peer matching service 104 determines whether or not to lower the restrictions being applied in the contention management mode. For example, the conditions may improve enough where contention management mode is not needed at all or less restrictions are needed. If the contention management mode is lowered, then at 514, peer matching service 104 lowers the contention management such as by removing some restrictions or transitioning the bucket to the normal operating mode. If the contention management mode is not removed, then the process may reiterate to continue monitoring at 508.

Referring back to 510, if additional restrictions are applied, the process reiterates to 506 to initiate another restriction. The reiterative process may apply different levels of restrictions based on instructions. For example, in a first level, peer matching service 104 applies a restriction to limit the connections or limit the bandwidth used by client devices 110 in the bucket. For example, a first client device 110 may have connections limited to 5 connections from a previous limit of 50 connections. All client devices 110 in the bucket may be limited to 5 connections; however, the number of connections may vary per client device 110. The limiting of connections may limit the cross-connectivity of client devices 110 using access point 112. The limits may be incoming connections, outgoing connections, or a combination. Also, the bandwidth may be limited by only allowing client devices 110 to download a certain amount of content. Also, some clients may be told to increase their bandwidth used during a time period.

However, if the first level of restrictions does not improve conditions at access point 112, peer matching service 104 may initiate a second level of restrictions based on instructions. For example, peer matching service 104 determines whether to drop some connections. The dropping of connections causes client devices 110 to drop some existing connections they already have to download content from other peer client devices 104.

If the second level of restrictions does not improve conditions at access point 112, peer matching service 104 may initiate a third level of restrictions based on instructions. For example, peer matching service 104 may cause client devices 110 to wait to start a transfer or to pause a transfer. In waiting to start a transfer, client devices 110 may be given a time in which they may start downloading content file 108. The pausing of a transfer may pause an existing transfer.

System Example

Figure 6:
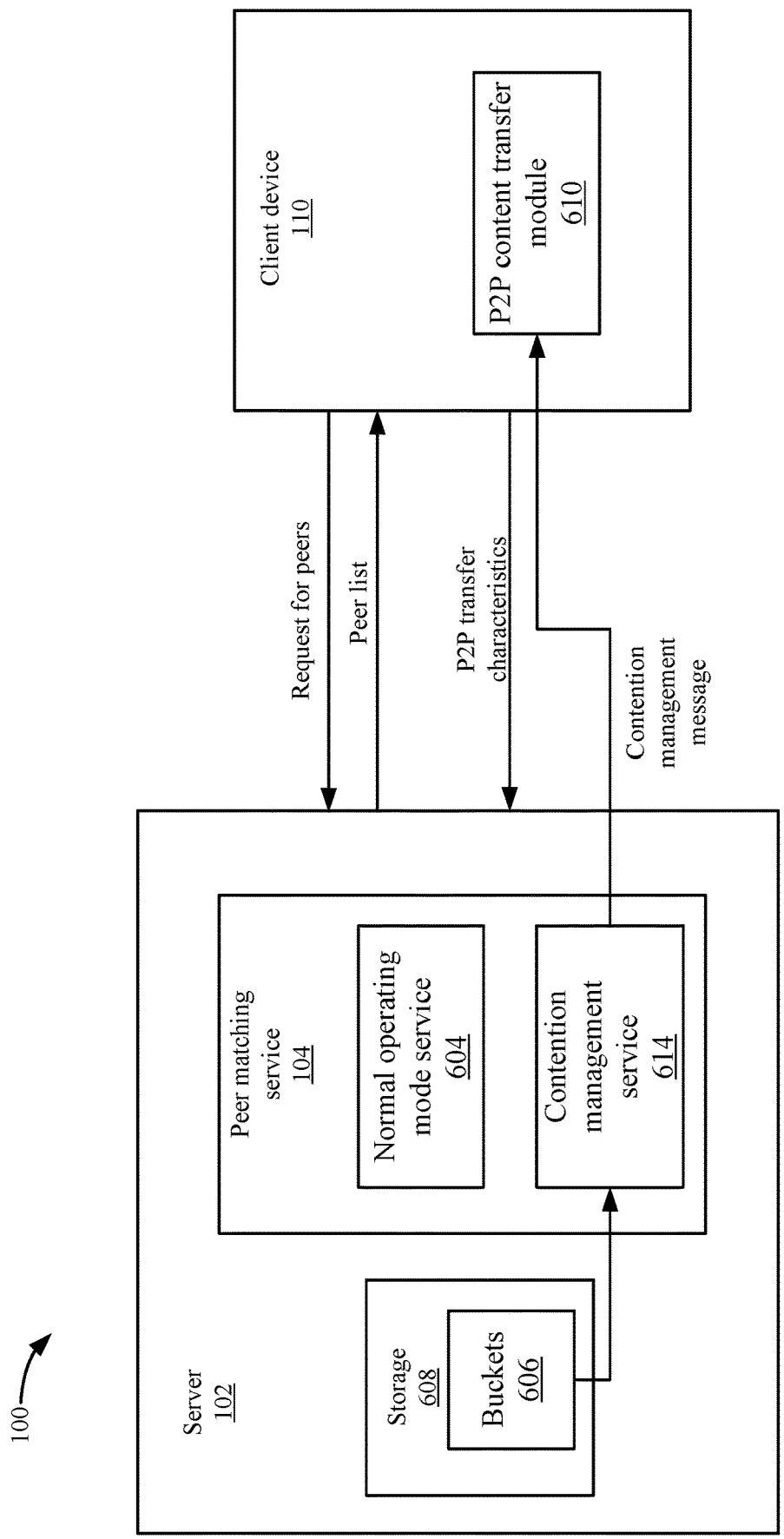
FIG. 6 depicts a more detailed example of the peer matching service and a client device according to some embodiments.

FIG. 6 depicts a more detailed example of peer matching service 104 and client device 110 according to some embodiments. Client device 110 sends a request for the P2P content download of content file 108. When operating in the normal mode, a normal operating mode service 604 processes the request. For example, normal operating mode service 604 may generate a bucket 606 or select an existing bucket 606 in storage 608 in which to insert client device 110. Also, normal operating mode service 604 may generate a peer client device list and send that list back to client device 110. A P2P content download module 610 in client device 110 can the contact peer client devices on the list to download content file 108.

Contention management service 614 can then monitor bucket 606 to determine when to transition from the normal operating mode into the contention management mode. Contention management service 614 may receive peer to peer transfer characteristics for the bucket from client devices 110 that are in bucket 606. Content management service 614 can then determine if contention management mode should be enabled for bucket 606. During contention management mode, contention management service 614 may determine restrictions on communications for client devices 110 in bucket 606. Then, contention management service 614 sends a contention management message to client device 110 (and other client devices not shown) that applies restrictions on the peer to peer transfer of content file 108 at client device 110. This orchestrates or controls the behavior of client device 110 remotely.

P2P content transfer module 610 receives the contention management message and implements the restriction in the message. For example, the restriction changes the P2P download behavior for client device 110, such as P2P content transfer module 610 may limit connections or bandwidth, drop connections, enter into a wait mode to download content file 108, or pause an active download.

Examples of Restrictions

Figure 7A:
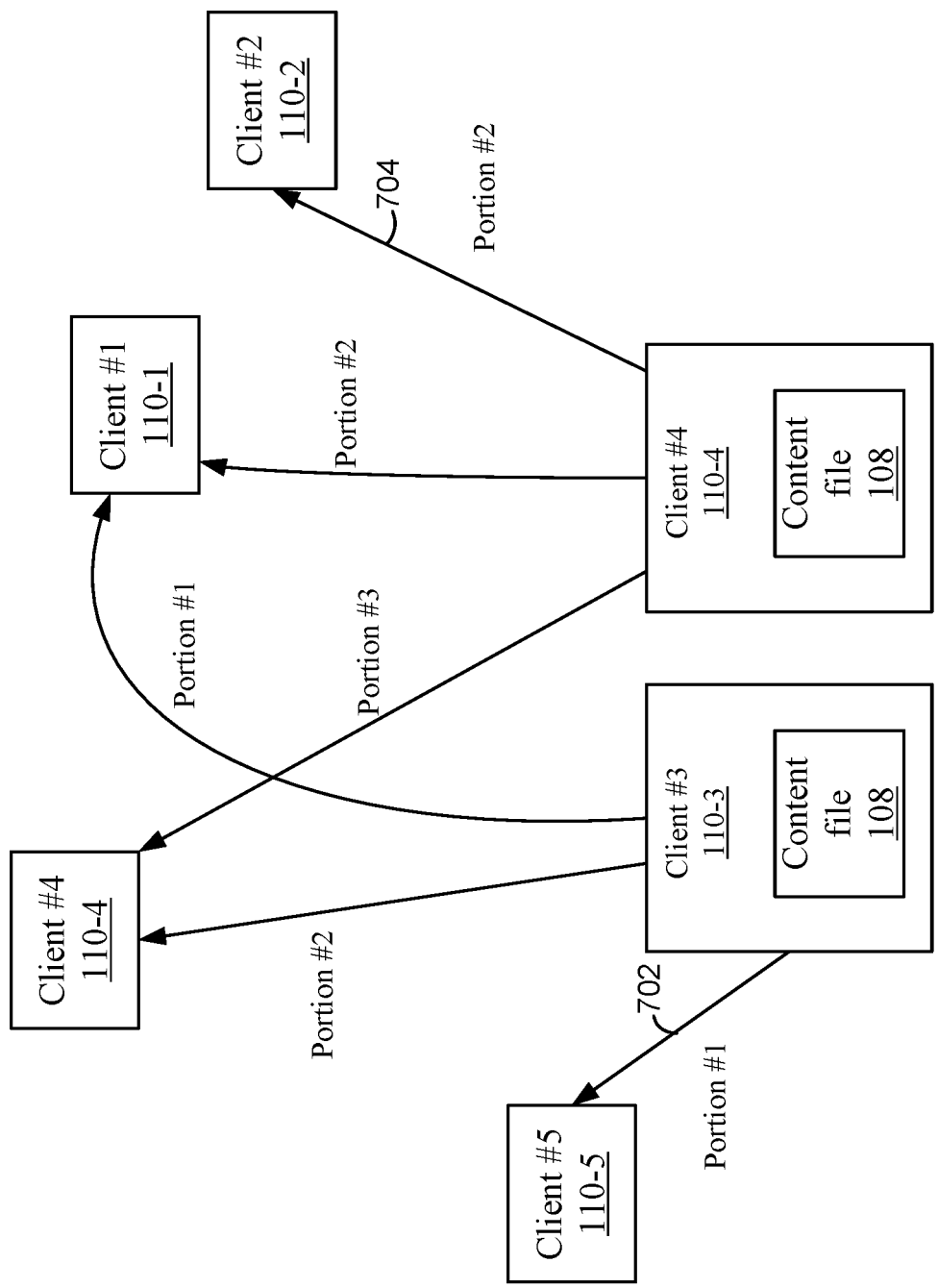
FIG. 7A shows an example when connections are limited according to some embodiments.
Figure 7B:
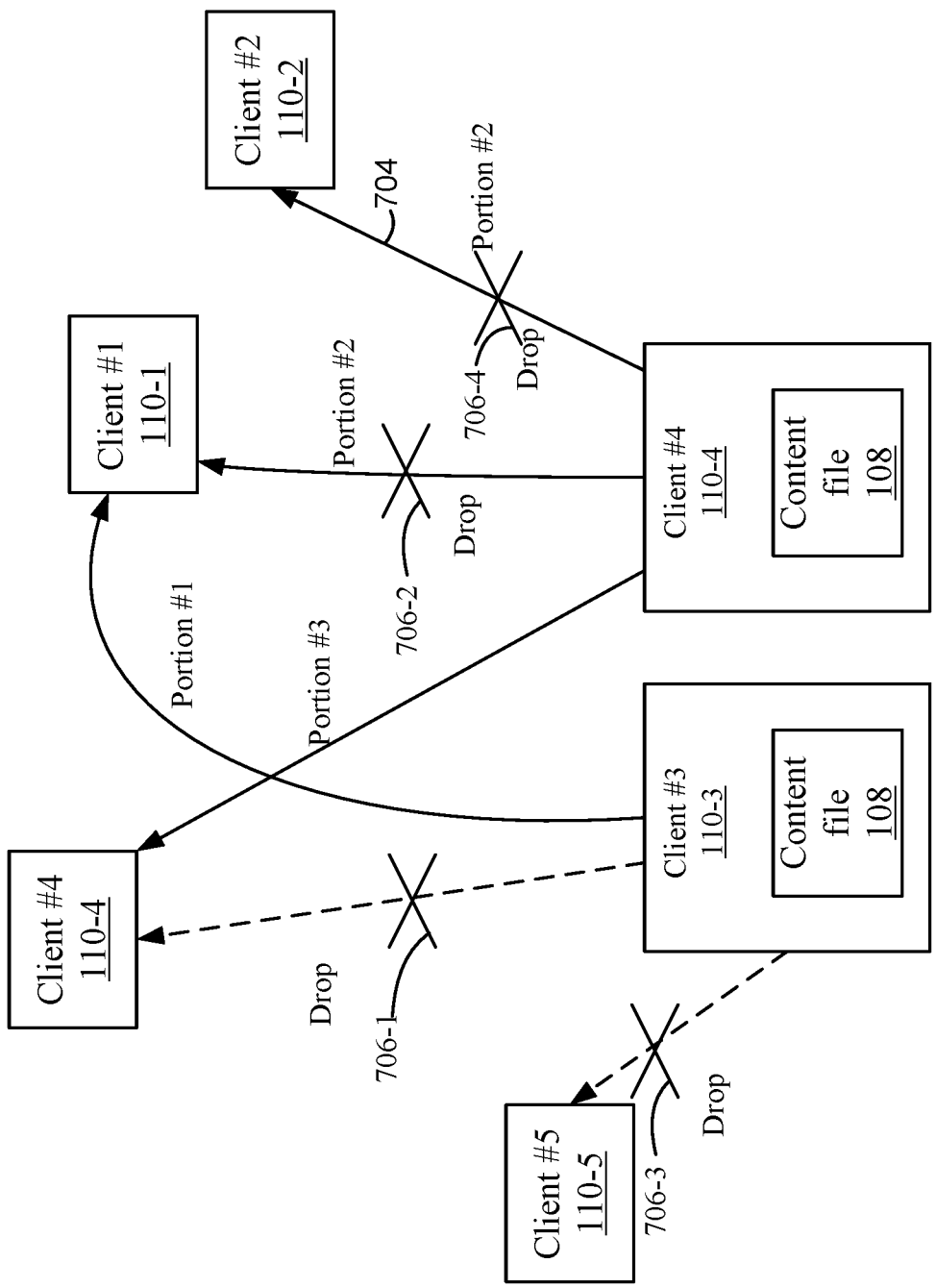
FIG. 7B depicts an example where a restriction causes client devices to drop connections according to some embodiments.
Figure 7C:
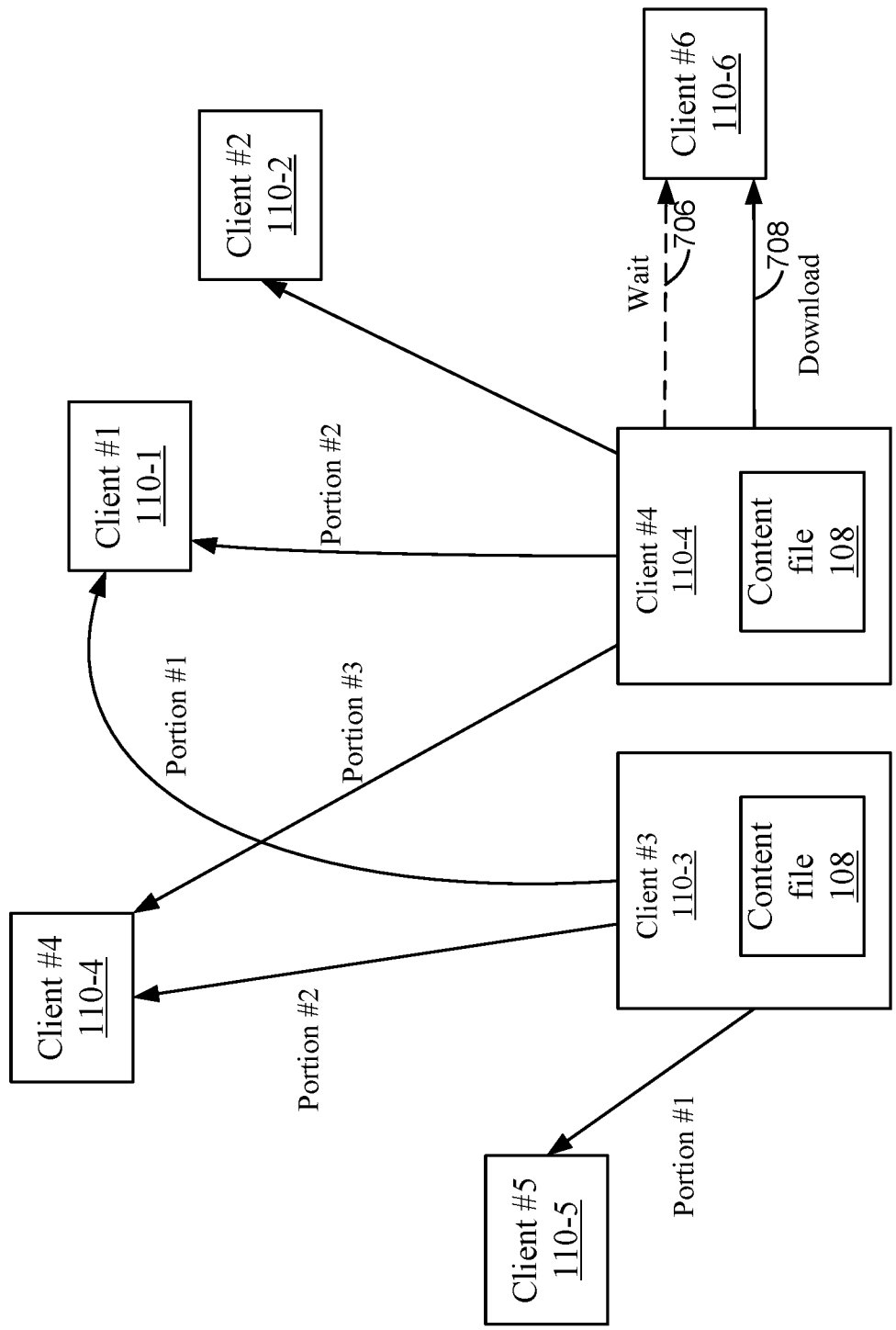
FIG. 7C depicts an example where client devices are given the restriction to wait according to some embodiments.

As mentioned above, peer matching service 104 may use different levels of restrictions. FIGS. 7A-7C depict different scenarios in which client devices 110 change behavior according to the restrictions received from peer matching service 104 according to some embodiments. FIG. 7A shows an example when connections are limited according to some embodiments. In a normal operating mode, a first client device 110-1 may be connected to client devices 110-2, 110-3, and 110-4. In some embodiments, client device 110-1 may be downloading content file 108 from client devices 110-3 and 110-4. Also, client device 110-4 also be downloading content file 108 from client devices 110-3 and 110-4. Different portions may be downloaded from different peer client devices 110. Although only two connections are shown, it is possible that more connections could be initiated.

When contention management mode is enabled, the number of connections may be limited to one connection. In this case, a new client device 110-5 may only initiate one connection at 702 to client device 110-3 to download content file 108. Also, a new client device 110-2 may only initiate one connection at 704 to client device 110-4 to download content file 108. Peer matching service 104 may orchestrate the restriction by sending a message to client device 110-5 to initiate only one connection.

FIG. 7B depicts an example where a restriction causes client devices 110 to drop connections according to some embodiments. In some embodiments, client devices 110 may be limited in having connections for receiving content file 108. Using the above-described scenario where client device 110-4 is connected to client devices 110-3 and 110-4, at 706-1, client device 110-4 may drop the connection to client device 110-3. Also, at 706-2, client device 110-1 may drop the connection to client device 110-4. Peer matching service 104 may orchestrate the dropping by sending a drop connection message to respective client devices 110-1 and 110-4, or to client devices 110-3 and 110-4.

In another embodiment, client devices 110 may be limited in having connections for providing content file 108. If this is the case, client device 110-3 may additionally drop the connection to client device 110-5 at 706-3. Also, at 706-4, client device 110-4 may drop the connection to client device 110-2. Peer matching service 104 may orchestrate the dropping by sending a drop connection message to respective client devices 110-2 and 110-5, or to client devices 110-3 and 110-4.

FIG. 7C depicts an example where client devices are given the restriction to wait according to some embodiments. In this case, a client device 110-2 may be waiting in the system until a time is reached to download content file 108. At 708, when the time is reached at time T1, client device 110-6 initiates a connection to client device 110-3 to download the portion of content file 108.

Change in Receiver/Provider Lists

In a bucket, certain client devices 110 may be providers of the content and certain client devices 110 may be receivers of content file 108. Also, client devices 110 may be both receivers and providers. Both receivers and providers can reach out to peer client devices 110 for connections. Providers may be allowed to reach out to receivers because for some network conditions, the providers can initiate a connection, but may not be able to receive a connection. Peer matching service 104 may determine at some point that the list of peer client devices 110 that is sent to the providers should be reduced or eliminated. For example, if there are 500 client devices 110 connected to access point 112, at some point there may be only 480 receivers and 20 providers. At this point, allowing the providers to reach out to the receivers is acceptable because it is desirable for the 480 receivers to receive content file 108 as quickly as possible. However, when a situation occurs such that there are a lot more providers than receivers, for example, 20 receivers and 480 providers, if all 480 providers reached out to the 20 receivers, the peer-to-peer network could become congested. This may not be desirable because the small amount of receivers only need to connect to a small number of providers to download content file 108. Accordingly, peer matching service 104 may restrict the number of peer client devices sent to providers at some point.

Figure 8:
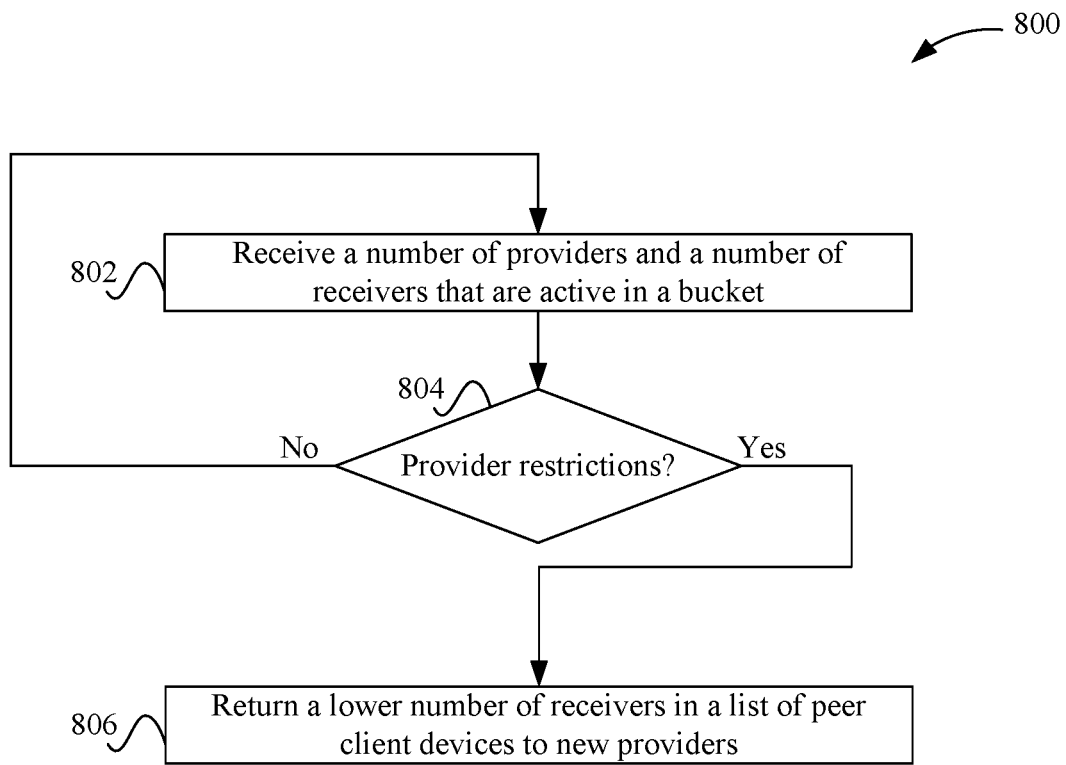
FIG. 8 depicts a simplified flowchart of a method for enabling restrictions according to the number of receivers and providers according to some embodiments.

FIG. 8 depicts a simplified flowchart 800 of a method for enabling restrictions according to the number of receivers and providers according to some embodiments. At 802, peer matching service 104 receives a number of providers and a number of receivers that are active in a bucket.

At 804, peer matching service 104 compares the ratio of receivers and providers to a threshold to determines whether to apply provider restrictions. Although a ratio is described, other comparisons may be performed, such as a comparison to just a number of providers. The comparison determines whether or not restrictions should be enabled for providers. For example, peer matching service 104 determines when the number of providers compared to a number of receivers goes above a ratio.

If peer matching service 104 determines not to apply provider restrictions, the process reiterates to 802 to continue to analyze the number of providers and receivers. However, at 806, if restrictions should be applied to the providers, peer matching service 104 returns a lower number of receivers in a list of peer client devices 110 to a new provider. In some cases, some new providers may not be provided any client receivers. Also, peer matching service 104 may remove receivers from a list of receivers for providers that are already active.

System Overview

Figure 9:
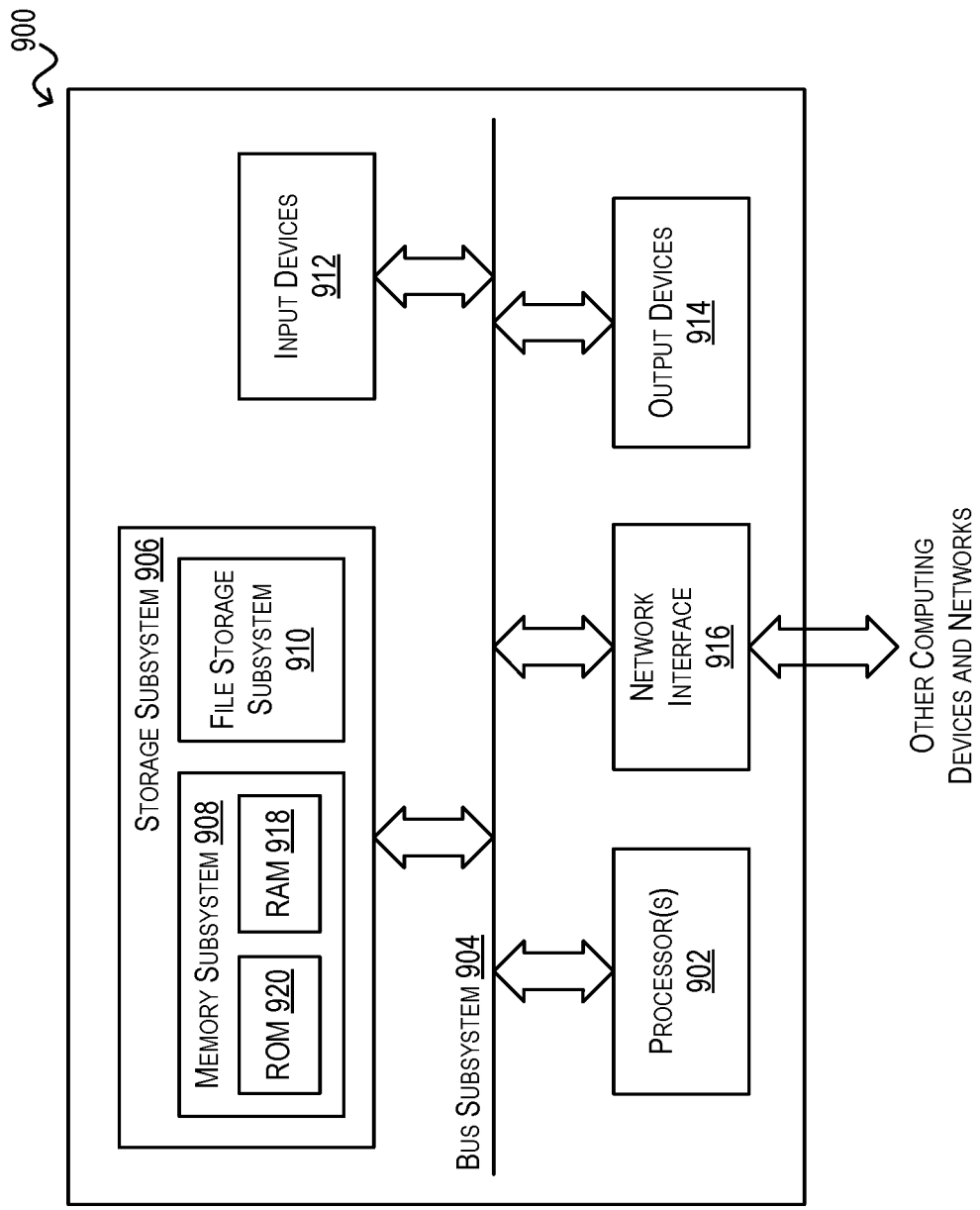
FIG. 9 is a simplified block diagram of a computer system according to an embodiment.

FIG. 9 is a simplified block diagram of a computer system 900 according to an embodiment. In some embodiments, computer system 900 can be used to implement peer matching service 104. As shown in FIG. 9, computer system 900 includes one or more processors 902 that communicate with a number of peripheral devices via a bus subsystem 904. These peripheral devices include a storage subsystem 906 (comprising a memory subsystem 908 and a file storage subsystem 910), user interface input devices 912, user interface output devices 914, and a network interface subsystem 916.

Bus subsystem 904 can provide a mechanism for letting the various components and subsystems of computer system 900 communicate with each other as intended. Although bus subsystem 904 is shown schematically as a single bus, alternative embodiments of the bus subsystem can utilize multiple busses.

Network interface subsystem 916 can serve as an interface for communicating data between computer system 900 and other computer systems or networks. Embodiments of network interface subsystem 916 can include, e.g., an Ethernet card, a Wi-Fi and/or cellular adapter, a modem (telephone, satellite, cable, ISDN, etc.), digital subscriber line (DSL) units, and/or the like.

User interface input devices 912 can include a keyboard, pointing devices (e.g., mouse, trackball, touchpad, etc.), a scanner, a barcode scanner, a touch-screen incorporated into a display, audio input devices (e.g., voice recognition systems, microphones, etc.) and other types of input devices. In general, use of the term "input device" is intended to include all possible types of devices and mechanisms for inputting information into computer system 900.

User interface output devices 914 can include a display subsystem, a printer, a fax machine, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computer system 900.

Storage subsystem 906 includes a memory subsystem 908 and a file/disk storage subsystem 910. Subsystems 908 and 910 represent non-transitory computer-readable storage media that can store program code and/or data that provide the functionality of embodiments of the present invention.

Memory subsystem 908 includes a number of memories including a main random access memory (RAM) 918 for storage of instructions and data during program e9ecution and a read-only memory (ROM) 920 in which fi9ed instructions are stored. File storage subsystem 910 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 900 is illustrative and not intended to limit embodiments of the present invention. Many other configurations having more or fewer components than system 900 are possible.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A computer system comprising:
one or more computer processors; and
a non-transitory computer-readable storage medium comprising instructions, that when executed, cause the one or more computer processors to:
classifying a plurality of client devices into a bucket, wherein similar network identification information is received from the plurality of client devices, the similar network identification information being associated with an access point to which the plurality of client devices are connected to transfer content via a peer to peer transfer;
determining whether to transition the bucket from a first operating mode into a contention management mode based on a status of at least a portion of the plurality of client devices in the bucket, the status based on at least a connection type for the portion of the plurality of client devices; and
when the bucket is transitioned into the contention management mode:
applying a set of instructions associated with the contention management mode to characteristics associated with the portion of the plurality of client devices in the bucket to determine a restriction for the peer to peer transfer of the content through the access point; and
communicating with multiple client devices of the plurality of client devices to apply the restriction among the multiple client devices for the peer to peer transfer of the content through the access point, wherein communicating with the multiple client devices comprises:
instructing a first set of client devices to limit a bandwidth used to transfer content with other client devices or limit a number of connections with other client devices;
after instructing the one or more first client devices to limit the bandwidth or limit the number of connections, re-applying the set of instructions associated with the contention management mode to new characteristics for the portion of the plurality of client devices in the bucket to determine whether further restrictions are needed; and
when further restrictions are needed, instructing a second set of client devices to drop a number of connections with other client devices.

2. The computer system of claim 1, further comprising:
receiving a request from the plurality of client devices to initiate the peer to peer transfer of the content; and
providing a list of client devices to each of the plurality of client devices, the client devices in the list being eligible to perform the peer to peer transfer with a respective client device in the plurality of client devices.

3. The computer system of claim 1, wherein the network identification information comprises a network address associated the access point to which the plurality of client devices are connected.

4. The computer system of claim 3, wherein the access point comprises a wireless access point that uses a wireless connection type to allow the plurality of client devices to perform the peer to peer transfer.

5. The computer system of claim 1, wherein:
the connection type is a first connection type and the portion of the plurality of client devices comprises a first portion of the plurality of client devices,
the first portion of the plurality of client devices use the first connection type, and
the bucket includes a second portion of set of the plurality of client devices that use a second connection type different from the first connection type.

6. The computer system of claim 5, wherein determining whether to enter the bucket into the contention management mode comprises:
comparing a number of the first portion of the plurality of client devices to a total number of the plurality of client devices in the bucket; and
entering the bucket into the contention management mode based on the comparing.

7. The computer system of claim 6, wherein:
the first connection type is a wireless connection type,
the second connection type is a wired connection type, and
a number of the second portion of the plurality of client devices is used to determine the total number of the plurality of client devices.

8. The computer system of claim 1, wherein applying the set of instructions comprises:
determining a number of the portion of the plurality of client devices that are using the connection type in the peer to peer transfer; and
selecting the restriction to limit the number of connections or limit the bandwidth when the number of the portion of the plurality of client devices meets a threshold.

9. The computer system of claim 1, wherein applying the set of instructions comprises:
determining a network usage among the portion of the plurality of client devices in the peer to peer transfer, wherein the network usage includes at least one of a number of current connections between the plurality of client devices using the access point and a bandwidth used by the plurality of client devices using the access point; and
selecting the restriction to limit the number of connections or limit the bandwidth when the network usage meets a threshold.

10. The computer system of claim 1, wherein the restriction to limit the number of connections instructs a client device in the plurality of client devices to limit the number of connections with other client devices and without limiting the bandwidth with the other clients.

11. The computer system of claim 1, wherein the restriction to limit the bandwidth instructs a client device in the plurality of client devices to limit bandwidth used to transfer content with other client devices and without limiting the number of connections with the other client devices.

12. The computer system of claim 1, wherein the restriction to drop the number of connections instructs a client device in the plurality of client devices to drop the number of connections with other client devices.

13. The computer system of claim 1, wherein the restriction to limit the number of connections instructs a client device in the plurality of client devices to wait to connect to other client devices to transfer the content or pause an active transfer of content with another client device.

14. The computer system of claim 1, wherein applying the set of instructions comprises:
comparing a ratio of a first number of provider client devices and a second number of receiver client devices to a threshold, wherein the provider client devices in the plurality of client devices provide the content and the receiver client devices in the plurality of client devices receive the content; and
restricting the provider client devices from providing the content when the threshold is met.

15. The computer system of claim 1, wherein communicating with the multiple client devices of the plurality of client devices to apply the restriction to limit connections to the peer to peer transfer of the content comprises:
after instructing the one or more second client devices to drop the number of connections, re-applying the set of instructions associated with the contention management mode to new characteristics for the portion of the plurality of client devices in the bucket to determine whether further restrictions are needed; and
when further restrictions are needed, instructing one or more third client devices to wait to connect to other client devices to transfer the content or pause a connection that is transferring content with another client device.

16. A non-transitory computer-readable storage medium containing instructions, that when executed, control a computer system to be configured for:
classifying, by a computing device, a plurality of client devices into a bucket, wherein similar network identification information is received from the plurality of client devices, the similar network identification information being associated with an access point to which the plurality of client devices are connected to transfer content via a peer to peer transfer;
determining, by the computing device, whether to transition the bucket from a first operating mode into a contention management mode based on a status of at least a portion of the plurality of client devices in the bucket, the status based on at least a connection type for the portion of the plurality of client devices; and
when the bucket is transitioned into the contention management mode:
applying a set of instructions associated with the contention management mode to characteristics associated with the portion of the plurality of client devices in the bucket to determine a restriction for the peer to peer transfer of the content through the access point; and
communicating with multiple client devices of the plurality of client devices to apply the restriction among the multiple client devices for the peer to peer transfer of the content through the access point, wherein communicating with the multiple client devices comprises:
instructing a first set of client devices to limit a bandwidth used to transfer content with other client devices or limit a number of connections with other client devices;
after instructing the one or more first client devices to limit the bandwidth or limit the number of connections, re-applying the set of instructions associated with the contention management mode to new characteristics for the portion of the plurality of client devices in the bucket to determine whether further restrictions are needed; and
when further restrictions are needed, instructing a second set of client devices to drop a number of connections with other client devices.

17. A computer system comprising:
one or more computer processors; and
a non-transitory computer-readable storage medium comprising instructions, that when executed, cause the one or more computer processors to:
determining network identification information associated with a client device and a connection type used by the client device to transfer content through an access point;
sending the network identification information and the connection type to a peer matching service;
receiving a list of peer client devices that are eligible for peer to peer transfer of content using the access point;
performing the peer to peer transfer of the content with one or more peer client devices in the list of peer client devices;
receiving a first message to apply a first restriction to limit a bandwidth used to transfer content with other client devices or limit a number of connections with other client devices into the peer to peer transfer of the content, the restriction determined by the peer matching service entering a bucket of a plurality of client devices including similar network identification information as the client device into a contention management mode based on a status of at least a portion of the plurality of client devices in the bucket, the status based on at least the connection type for the at least a portion of the plurality of client devices; and
applying the first restriction to limit the bandwidth used to transfer content with other client devices or limit the number of connections with other client devices with one or more other peer client devices for the peer to peer transfer of the content at the client device;
receiving a second message to apply a second restriction to drop a number of connections with other client devices when the peer matching service determines further restrictions are needed based on a new status of the portion of the plurality of client devices in the bucket after applying the first restriction.

18. The computer system of claim 17, wherein applying the first restriction comprises:
limiting the number of connections with one or more other peer client devices or limiting the bandwidth used to transfer content with other peer client devices in the list.

19. The computer system of claim 17, wherein applying the second restriction comprises:
dropping the number of connections with one or more other peer client devices in the list.

20. The computer system of claim 17, wherein applying the first restriction comprises:
waiting to connect to other peer client devices to transfer the content or pausing an active transfer or content with another peer client device in the list.

* * * * *